United States Patent [19]
Williams et al.

[11] Patent Number: 5,525,003
[45] Date of Patent: Jun. 11, 1996

[54] CONNECTION TERMINATION FOR COMPOSITE RODS

[75] Inventors: Jerry G. Williams; Randall G. Ivie; Joseph L. Schiltz, all of Ponca City, Okla.

[73] Assignee: Conoco Inc., Ponca City, Okla.

[21] Appl. No.: 175,009

[22] Filed: Dec. 29, 1993

[51] Int. Cl.$^6$ ........................... F16B 2/14
[52] U.S. Cl. .................. 403/267; 24/136 R; 24/115 M; 403/265; 428/377
[58] Field of Search ............... 24/115 M, 130, 24/136 L, 136 R; 403/265, 267, 268, 269; 428/375, 376, 377, 378

[56] References Cited

U.S. PATENT DOCUMENTS

| | | | |
|---|---|---|---|
| 3,099,109 | 7/1963 | Hahn | 52/223.13 |
| 3,355,202 | 11/1967 | Shannon | 403/269 X |
| 3,660,887 | 5/1972 | Davis | 403/268 X |
| 3,672,712 | 6/1972 | Davis | 403/268 |
| 3,698,749 | 10/1972 | Yonkers | 403/368 X |
| 3,739,457 | 6/1973 | Davis | 403/269 X |
| 3,877,523 | 4/1975 | Ely | 403/202 |
| 3,960,459 | 6/1976 | Hering et al. | 403/267 |
| 4,127,741 | 11/1978 | Bauer et al. | 403/268 X |
| 4,130,926 | 12/1978 | Willem | 403/268 X |
| 4,367,568 | 1/1983 | Weiser | 403/367 X |
| 4,433,933 | 2/1984 | Parsons, Jr. et al. | 403/268 |
| 4,475,839 | 10/1984 | Strandberg | 403/268 X |
| 4,596,486 | 6/1986 | Niederer, Sr. | 403/268 |

*Primary Examiner*—Kenneth J. Dorner
*Assistant Examiner*—Andrea Chop
*Attorney, Agent, or Firm*—M. Kathryn Tsirigotis; John E. Holder

[57] ABSTRACT

This invention relates to an improved termination connection for advanced fiber composite cables of the type comprised of fibers fixed in a matrix binder. In particular, the composite cable is provided with one or more ribs of tension wound tension fiber impregnated fiber cured on the end portion thereof. Potting material is secured over the ribs at the end of the cable preferably having a parabolically curved outwardly tapered contour to distribute the longitudinal and transverse forces over the fibers in the cable.

17 Claims, 2 Drawing Sheets

5,525,003

CONNECTION TERMINATION FOR COMPOSITE RODS

FIELD OF THE INVENTION

This invention relates to potting the termination of cables, tethers and other tension carrying members for connecting to suitable connection devices.

BACKGROUND OF THE INVENTION

Advanced technology fibers, such as aramid and graphite or carbon, have substantial tensile strength for their weight and size which makes such fibers desirable for use in many engineering applications. Many applications of such fibers are well known, such as in the aircraft industry. Such fibers are often used in conjunction with a matrix binder to fix the fibers in particular orientations and to give form and structure to the intended device. One such use for such advanced fiber composites is for cables, tethers or other tension carrying devices. However, the advanced fiber composite cable is not easily secured at its ends. The problem is recognized in the art, but fully effective solutions have until now, been illusive.

There are a number of reasons for the difficulty in providing a reliable and satisfactory connection or termination for advanced fiber composite cables. For example, the fibers tend to be rather brittle in their transverse orientation in spite of their great longitudinal strength. Thus, clamping type devices which impose high compressive forces on the cable are not very suitable as they are likely to damage the fibers.

Another aspect of the difficulty for providing a connection termination for fiber composite cable is explained in U.S. Pat. No. 3,660,887 to Davis. In particular, the longitudinal load is not necessarily uniformly distributed across the cross section of the cable because of the weak bridging strength of matrix binders. As such, stress forces are concentrated on particular fibers, usually along the periphery thereof, which may exceed their strength limitations causing such over stressed fibers to break, and may eventually lead to catastrophic failure of the cable.

One well known technique for forming terminations for cables, in general, is called potting. Pottings are enlarged ends at the termination of a cable which enable a structural element to obtain a secure mechanical grasp to the cable. However, the bond formed between the potting material and the fiber composite cable is typically weaker than the cable. Thus, a fiber composite cable provided with a conventional potted termination will fail by the cable simply pulling out of the termination. As such, the design limitation of such cables is the termination and not the cable per se, which is converse to normal engineering practice. Several design arrangements for potting fiber composite cables have been disclosed such as in U.S. Pat. Nos. 3,283,380, 3,660,887 and 3,672,712. Such arrangements have not provided satisfactory solutions for composite cables and tethers and other tension carrying devices.

In addition to the foregoing problems for providing connections for advanced fiber composite cables, the cables are particularly prone to failure at the termination in arrangements where the cable is subjected to cyclic loading or cyclically applied forces.

Clearly, there is a need for an improved, more effective termination design for advanced fiber composite cables.

Accordingly, it is an object of the present invention to provide a connection termination for composite rods and cables that overcomes the drawbacks of the prior art as discussed above.

It is a more particular object of the invention to provide a connection termination for composite rods and cables which securely holds the rods in the connection termination and does not cause the rods to fail in the connection termination.

SUMMARY OF THE INVENTION

The above and other objects of the invention are achieved by a connection termination at the terminal end of a composite rod wherein the connection termination includes at least one rib on the outer surface of the composite rod along a connection portion thereof near one end. The rib is formed of overlapping layers of fiber fixed in a resin matrix and is thereby bonded to the composite rod. A plug is provided over the rib and the connection portion of the composite rod for connecting to a supporting structure and for transferring tensile forces thereto.

The invention further relates to a connection termination for a cable made of a plurality of composite rods wherein the connection termination has at least one rib on the outer surface of a some of the composite rods along a connection portion thereof near one end of the composite rods. The ribs are formed of overlapping layers of fiber fixed in a resin matrix and thereby bonded to each of the composite rods. A plug is secured to each of the ribs and to the connection portions of the composite rods for connecting to the supporting structure and transferring tensile forces thereto.

BRIEF DESCRIPTION OF THE DRAWINGS

Some of the objects and advantages of the invention have been set forth above, and others will become apparent as the description proceeds when taken in conjunction with the accompanying drawings in which—

DETAILED DESCRIPTION OF THE PREFERRED EMBODIMENTS

Figure 1:
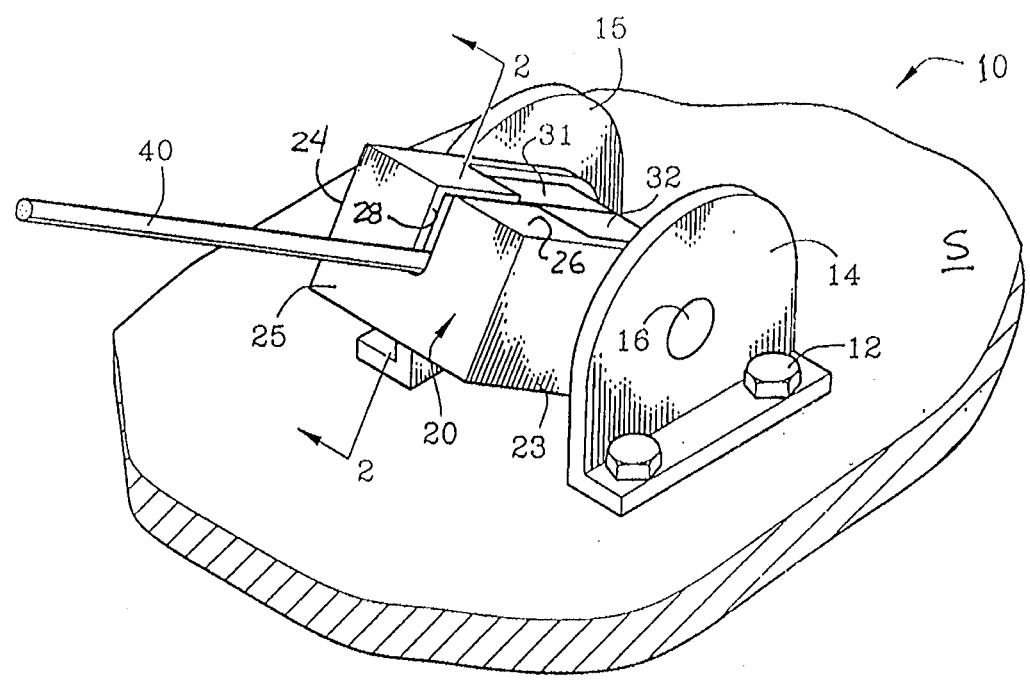
FIG. 1 is a perspective view of a connection device secured to a fragmentarily illustrated structural body and connected to a fiber composite cord, wherein the cord includes a termination at the end embodying the features of the present invention.

Referring now more particularly to the drawings, FIG. 1 illustrates a connection device, generally indicated by the number 10, for receiving and securing a fiber composite cord 40 to a structure S. The illustrated connection device 10 is intended to be representative of many methods and mechanisms for connecting a potted cable and is used here only for purposes of explanation of how a potted cable may be secured to some type of structural element. As illustrated, the connection device 10 is secured to a fragmentarily illustrated structure S by bolts 12. The structure S may be a fixed member, such as a concrete casting firmly planted in the earth, or a movable member such as a counter weight or boom of a crane. Other applications that have been considered are tethers for offshore tension leg oil production platforms and cables for suspension bridges. Clearly, the types and varieties of members that may have a cable attached thereto by the connection technique of the present invention are many and it is not intended that the scope of protection for the invention be limited for failure to anticipate all classes or types of such structures. Accordingly, the particular structure S does not form a part of the present invention.

The connection device be, as illustrated, generally comprises two laterally spaced apart and generally parallel plates 14 and 15. The plates 14 and 15 may be connected by a common flange or attached directly to the structure S independently of one another, as illustrated. Each of the plates 14 and 15 include a generally coaxially aligned hole through which is received a shaft 16. A clevis type fixture 20 is disposed generally between the plates 14 and 15 and attached to the shaft 16 for pivoting about the axis of the shaft 16.

Figure 2:
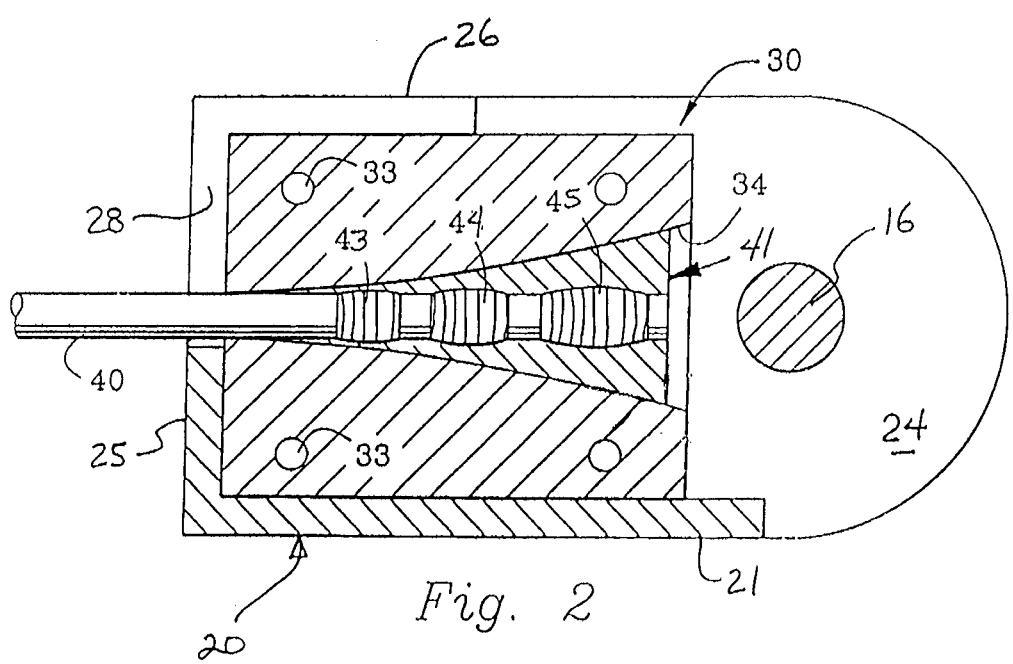
FIG. 2 is an enlarged cross sectional view of the connection device taken along the line 2—2 in FIG. 1 revealing the details of the invention.
Figure 3:
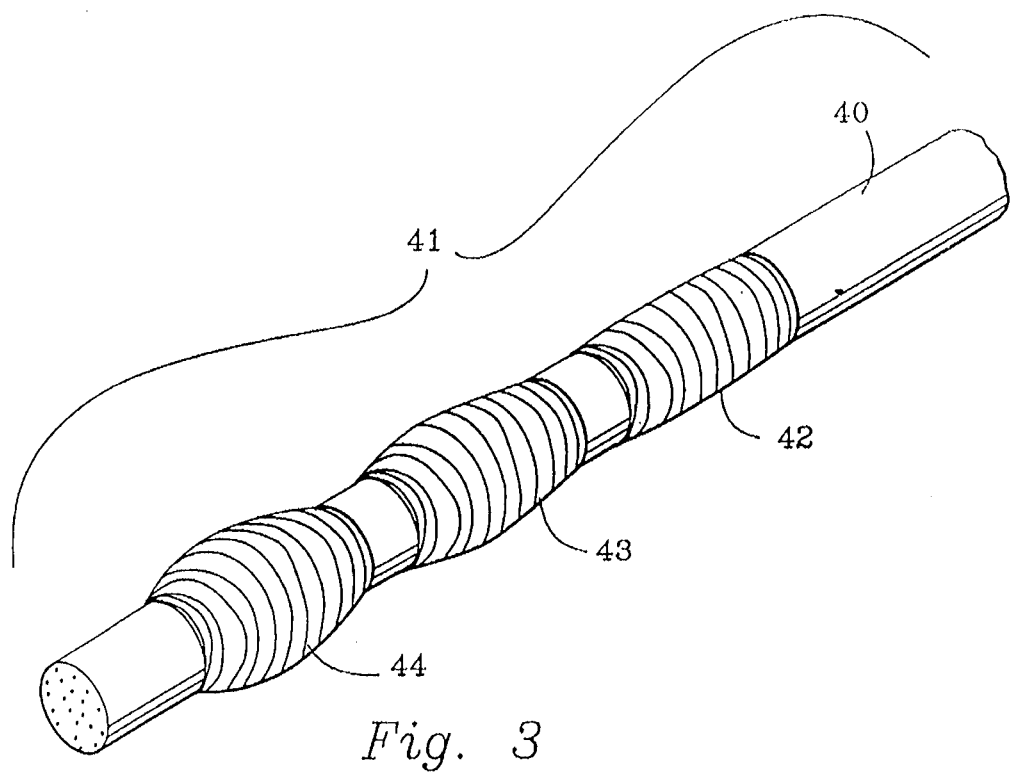
FIG. 3 is a perspective view of the end of the cord showing part of the termination structure and the end thereof.

The fixture 20, which forms a part of the connection device 10, is a single unit comprised of a bottom plate 21, opposite generally parallel side plates 23 and 24, a face plate 25 at the distal end of the fixture 20, and a top plate 26 spaced above and generally parallel to the bottom plate 21. The opposite side plates 23 and include generally coaxially aligned holes through which is received the shaft 16. As should be apparent in FIGS. 1 and 2, the fixture 20 forms a semi enclosed sheath into which a shoe 30, as will be explained in more detail below, may nest into and be secured. The top plate 26 and face plate 25 include a slot 28 which extends generally longitudinally within the fixture 20, fully through the top plate 26 and about midway down the center of the face plate 25. The slot 28 might also be described as running generally parallel to the side plates 23 and 24

As noted above, the fixture 20 forms a semi enclosed sheath to receive the shoe 30. The shoe 30 is sized to nestingly fit into the sheath from the open end of the fixture 20 which is opposite of the face plate 25. As is better understood from the drawing figures, the shoe 30, once received into the fixture 20, is rather securely held in place by the respective plates of the fixture 20 and by the shaft 16.

The shoe 30 is comprised of two generally mirror image halves 31 and 32 that are secured one to the other by suitable means, such as bolts (not shown) through suitable bolt holes 33. With the mirror image halves 31 and 32 secured together, the shoe 30 includes a longitudinal opening defined by an interior surface 34.

The cord 40, illustrated in FIG. 1, is a high strength composite rod of the type comprising a plurality of longitudinal fibers fixed in a resin matrix. Such rods are known and are commercially available. In this invention, the cord 40 has been provided with a potted termination 41 at the end portion 42 for interfacing with the longitudinal opening in the shoe 30 to make the connection to the connection device 10.

In particular, the cord 40, in its conventional arrangement, has a generally smooth outer surface although it may have very fine longitudinal ridges due to the layup of the fibers internal to the cord 40. As noted above, the cord 40 is provided with a potted termination 41 to interface with the shoe 30 to form an effective attachment for the cord 40 to the connection device 10 and, thereby, to the structure S. Up to this point of the explanation, what has been described is a conventional termination. In the preferred arrangement according to the invention, the potted termination 41 is formed by first abrading the surface of the cord 40 along the end portion 42 which will generally be installed within the shoe 30. The abrasion may be by chemical or by mechanical means such as by scouring the surface with sandpaper or emery cloth.

Onto the abraded end portion 42 of the cord 40, one or more ribs are formed. As illustrated, three ribs 43, 44 and 45 are provided on the end portion 42 and oriented generally transversely to the axis of the cord 40. The ribs 43, 44 and 45 are preferably formed of overlapping layers of resin impregnated fiber tension wrapped around the cord 40 and cured so as to be fixed in a resin matrix and securely bonded to the cord 40. With the ribs 43, 44 and 45 securely formed and cured thereon, the cord 40 is then provided with potting material applied thereon. The potting material is a conventional type suitable for attachment to the cord 40 such as thermoplastic or thermoset resin including epoxy or low temperature melt metal alloy. The potting material is formed to provide the potted termination 41 with a particular outer contour to interface with the inner surface 34 of the shoe 30. The potting material forms a bond to both the ribs 43, 44 and 45 and the exposed portions of the potted termination 41. The presence of the ribs provides a much stronger connection between the potting material and the cord 40, particularly against shear forces along the surface of the cord 41 due to the outwardly projecting shape of the ribs and the secure bond of the ribs 43, 44 and 45 to the cord 40. In addition to the attachment provided by bonding, the ribs mechanically lock the cord 40 to the potted termination 41.

In the present arrangement, it is believed to be novel to use a parabolically curved surface of revolution with an outwardly tapered contour for the potted termination 41 and the inner surface 34 of the shoe 30. The parabolically curved outwardly tapered contour is illustrated in the drawing figures by the increasing outward slope of the taper of the potting 41. While the increasing slope may not be profoundly apparent in the drawings, finite element analysis which has been substantiated by experiments tend to show that the stresses on the fibers within the potting 41 are more evenly distributed when the potted termination 41 and the shoe 30 have a parabolically curved slip surface interface. A slip surface interface means that the potted termination 41 and the shoe 30 are not bonded or otherwise fixedly secured to one another at their interface but are allowed to slip one relative to the other. With this arrangement, the shoe 30 imposes concentric radial forces onto the potted termination 41, but wherein the radial forces are distributed so as to be greatest at the base end of termination (where the potted termination 41 has the greatest diameter) and least at the neck end of the termination (where the diameter of the potted termination 41 is smallest).

It is believed that the parabolically curved outwardly tapered surface creates a better distribution and rationalization of the radial and longitudinal stresses on the fibers within the cord 40 thereby reducing stress concentrations on particular fibers. In other words, the slope of the parabolically curved portion is greatest near the base end where the fibers will have minimal longitudinal loading. Thus, any movement of the potted termination in the shoe toward the face plate 25 will create greater radial forces at the base end and less radial forces at the neck end where the longitudinal forces will be considerably greater. As such the fibers do not have both substantial longitudinal forces and substantial radial forces applied at the same location.

In one particular aspect of the preferred embodiment of the present invention, the ribs 43, 44 and 45 do not necessarily have to have the same size or shape. In the preferred arrangement, the ribs 43, 44 and 45 are progressively larger in size, primarily in height, moving from the neck end of the potted termination 41 to the base end. In the preferred arrangement, the smaller ribs are in the smallest diameter portion of the potted termination 41; however, it may be reasonable to provide various sizes and shapes of ribs as may be desired.

Figure 4:
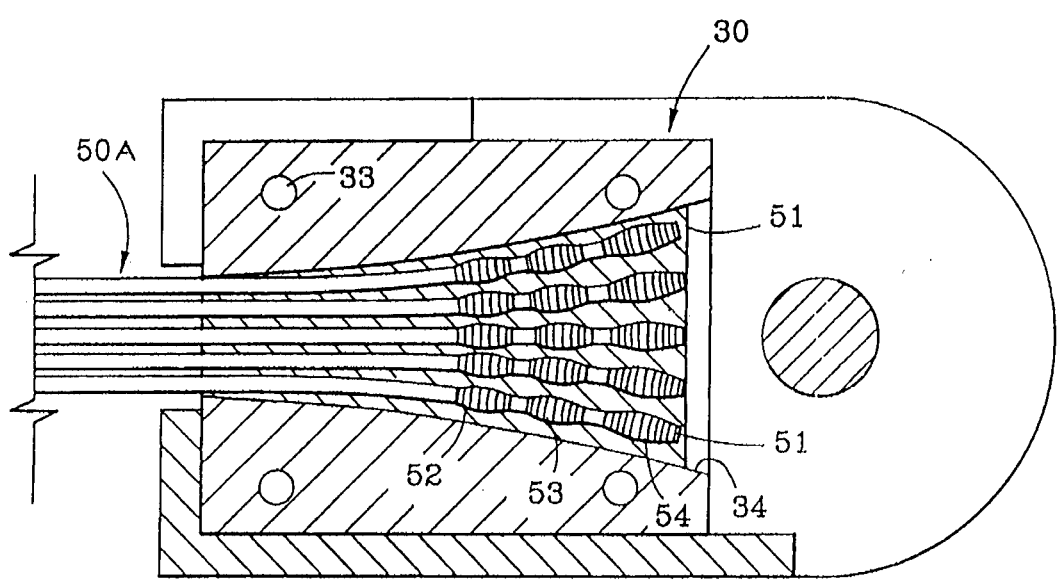
FIG. 4 shows a cross sectional view similar to FIG. 2 of a second embodiment of the invention wherein a cable comprised of a number of cords or rods is connected to the connection device.

Turning now to a second embodiment of the invention as illustrated in FIG. 4, there is illustrated a cable which is comprised of a plurality of rods 50A. Each of the rods may be similar to the cord 40 in the first embodiment. To simplify explanation of the second embodiment, similar elements are provided with the same reference numbers as in the first embodiment. In the second embodiment, all of the rods 50A which comprise the cable are secured in the potted termination 51. Similar to the first embodiment, the rods 50A are provided with ribs 53, 54 and 55 on the outer surfaces of the end portions thereof. It should be noted that it is preferred that all of the rods 50A are provided with ribs of similar type and number; however, it is not necessary that all the cords have ribs, nor all the ribs to be of similar type and number on each of the rods 50A, for the ribs to be of similar size and shape along each rod 50A. More preferably, the rods 50A are provided with ribs that are of successively larger diameter from the neck end to the base end of the potted termination 51 as illustrated in the drawing.

In the drawings and specification, there has been set forth embodiments of the invention, and although specific terms are employed, they are used in a generic and descriptive sense only and not for purposes of limitation.

We claim:

1. A high tensile strength composite cord of the type comprising a plurality of substantially longitudinal fibers fixed in a resin matrix and having a relatively smooth outer surface wherein said composite cord includes a connection termination near one end thereof for being connected to a supporting structure and transferring tensile forces thereto, said connection termination comprising:

at least one rib formed of overlapping layers of fiber fixed in a resin matrix and wound around and bonded to the outer surface of a connection portion of said composite rod near said one end thereof; and plug means secured to said at least one rib and to said connection portion of the composite cord for connecting to the supporting structure and transferring tensile forces thereto.

2. The cord according to claim 1 further comprising a plurality of spaced ribs on the outer surface of said composite cord.

3. The cord according to claim 1 wherein said at least one rib is substantially transverse to the longitudinal axis of said composite cord.

4. The cord according to claim 1 wherein said plug means has a tapered outer surface with its larger end nearest said one end of said composite cord.

5. The cord according to claim 4 wherein said tapered outer surface of said plug means curves outwardly.

6. The cord according to claim 1 wherein said plug means has a slip surface for interfacing with the supporting structure.

7. The cord according to claim 1 wherein the outer surface of said cord is abraded in the area where said at least one rib is bonded thereto.

8. The cord according to claim 7 wherein a plurality of ribs are tension wound around and bonded to the outer surface of the connection portion of said composite cord, and wherein the outer diameter of said ribs is progressively larger the nearer each rib is to said one end thereof.

9. A cable comprising a plurality of high tensile strength composite rods of the type comprising a plurality of substantially longitudinal fibers fixed in a resin matrix and having a relatively smooth outer surface wherein said cable includes a connection termination near one end of each of said composite rods for being connected to a supporting structure and transferring tensile forces thereto, said connection termination comprising:

at least one rib on the outer surfaces of some of said composite rods along a connection portion thereof near said one end of each of said composite rods, wherein said ribs are formed of overlapping layers of fiber fixed in a resin matrix and wound around and bonded to the outer surfaces of said connection portion of said composite rods; and plug means secured to each of said ribs and to said connection portions of said composite rods for connecting to the supporting structure and transferring tensile forces thereto.

10. The cable according to claim 9 wherein all of said composite rods each include a plurality of adjacent ribs on respective ones of said connection portions.

11. The cable according to claim 9 wherein each of said ribs is substantially transverse to the longitudinal axis of its respective composite rod.

12. The cable according to claim 9 wherein said plug means has an outwardly curved tapered outer surface with its larger end nearest said one end of said composite rods and wherein said outer surface has the shape of a segment of a parabola and being a surface of revolution generally about the longitudinal axis of said cable.

13. The cable according to claim 9 wherein the plug means has a slip surface for interfacing with the supporting structure.

14. The cable according to claim 9 wherein the outer surface of said rods where said ribs are bonded thereto is abraded.

15. A connection arrangement connecting one end of at least one composite rod to a supporting structure wherein said connection arrangement transfers tensile forces between said at least one composite rod and said supporting structure, said connection arrangement comprising;

at least one composite rod formed of a plurality of substantially longitudinal fibers fixed in a resin matrix and having a relatively smooth outer surface and a connection portion near said one end thereof;

at least one rib wound around the outer surface of said at least one composite rod along said connection portion wherein said at least one rib is formed of overlapping layers of fiber fixed in a resin matrix and thereby bonded to said at least one composite rod;

a shoe connected to said supporting structure and overlying said connection portion of said at least one composite rod; and plug means secured to said at least one rib and to said connection portion of the at least one composite rod for connecting to said shoe.

16. The arrangement according to claim 15 wherein said shoe has an inner tapered surface spaced radially from the outer surface of the at least one composite rod wherein the large end of said inner tapered surface is nearest the end of said at least one composite rod, and said plug means has an outer tapered surface complimentary to said inner tapered surface of said shoe such that said tapered surfaces abut against one another to secure said plug means to said shoe.

17. The connection arrangement according to claim 15 wherein the outer surface of said rod is abraded where said at least one rib is bonded thereto.

* * * * *